United States Patent
Riddick et al.

(10) Patent No.: US 12,504,356 B2
(45) Date of Patent: Dec. 23, 2025

(54) SYSTEMS AND METHODS FOR ERROR CORRECTION FOR VIDEO EXTENSOMETERS

(71) Applicant: Illinois Tool Works Inc., Glenview, IL (US)

(72) Inventors: Adrian Charles Riddick, Medfield, MA (US); Michael Ashman, Natick, MA (US); Wilson Villegas, Greenville, RI (US); Martin Allen Peterson, Wrentham, MA (US); Eric Stuebe, Needham, MA (US); Richard Balcarek, South Easton, MA (US)

(73) Assignee: Illinois Tool Works Inc., Glenview, IL (US)

( * ) Notice: Subject to any disclaimer, the term of this patent is extended or adjusted under 35 U.S.C. 154(b) by 271 days.

(21) Appl. No.: 17/739,243

(22) Filed: May 9, 2022

(65) Prior Publication Data

US 2022/0381660 A1   Dec. 1, 2022

Related U.S. Application Data

(60) Provisional application No. 63/193,984, filed on May 27, 2021.

(51) Int. Cl.
*G01N 3/06* (2006.01)
*G01N 3/62* (2006.01)

(52) U.S. Cl.
CPC .............. *G01N 3/068* (2013.01); *G01N 3/62* (2013.01); *G01N 2203/0647* (2013.01); *G01N 2203/0682* (2013.01)

(58) Field of Classification Search
CPC .. G01N 3/068; G01N 3/62; G01N 2203/0647; G01N 2203/0682; G01B 11/16
See application file for complete search history.

(56) References Cited

U.S. PATENT DOCUMENTS

| | | | |
|---|---|---|---|
| 8,600,147 B2 | 12/2013 | Iliopoulos | |
| 10,502,669 B2 * | 12/2019 | Peterson | ................ G01N 3/08 |
| 10,782,215 B2 * | 9/2020 | Peterson | ............... G01N 3/068 |
| 11,002,648 B2 * | 5/2021 | Peterson | ............... G06T 7/246 |

(Continued)

FOREIGN PATENT DOCUMENTS

| | | |
|---|---|---|
| CN | 111721225 | 9/2020 |
| EP | 3153839 | 4/2017 |

OTHER PUBLICATIONS

Int'l Search Report and Written Opinion ApplN No. PCT/US2022/028440 mailed Sep. 19, 2022.

*Primary Examiner* — Octavia Hollington
(74) *Attorney, Agent, or Firm* — McAndrews, Held & Malloy, Ltd.

(57) ABSTRACT

Systems and methods for materials testing include mage devices employing camera based image capture (e.g., vision or video) for measurement of strain on the test specimen. Such systems and methods collect multiple images of the specimen under test (i.e. during a testing process), with the images being synchronized with other signals of interest for the test (such as specimen load, machine actuator and/or crosshead displacement, etc.). The images of the specimen are analyzed (e.g., in real-time and/or post-test) by algorithms to locate and track specific specimen characteristics as the test progresses.

20 Claims, 12 Drawing Sheets

(56) References Cited

U.S. PATENT DOCUMENTS

| | | | | |
|---|---|---|---|---|
| 11,725,932 B2* | 8/2023 | Riddick | ............... | G01N 3/068 |
| | | | | 356/32 |
| 11,803,943 B2* | 10/2023 | Hoehl | ................... | H04N 25/63 |
| 11,867,668 B2* | 1/2024 | Hoehl | ................... | G01B 11/16 |
| 2003/0182069 A1* | 9/2003 | Banes | ................... | G01N 3/068 |
| | | | | 702/33 |
| 2017/0219468 A1* | 8/2017 | Peterson | ............... | G01B 11/16 |
| 2020/0103321 A1* | 4/2020 | Peterson | ............... | G01B 11/16 |
| 2020/0410648 A1 | 12/2020 | Hoehl | | |
| 2021/0404929 A1 | 12/2021 | Hoehl | | |

* cited by examiner

Air Knife

Active Vibration Control – A

Active Vibration Compensation

Illumination Compensation

SYSTEMS AND METHODS FOR ERROR CORRECTION FOR VIDEO EXTENSOMETERS

RELATED APPLICATIONS

The present application claims the benefit of, and priority to, U.S. Provisional Application No. 63/180,288, filed May 27, 2021, entitled "Systems And Methods For Error Correction For Video Extensometers." The complete subject matter and contents of U.S. Provisional Application No. 63/180,288 is incorporated herein by reference in its entirety.

BACKGROUND

Camera based vision systems have been implemented as part of materials testing systems for measurement of specimen strain. These systems collect one or more images of a specimen under test, with these images being synchronized with other signals of interest for the test (e.g., specimen load, machine actuator/crosshead displacement, etc.). The images of the test specimen can be analyzed to locate and track specific features of the specimen as the test progresses. Changes in the location of such features, such as changes in relative position of one or more reference features of the specimen, allows local specimen deformation to be calculated and, in turn, specimen strain to be computed.

Conventional systems employ cameras or other imaging systems to capture images from which to measure characteristics of the test specimen. However, imaging and/or measurement differences between a perceived reference position and an actual position can lead to distorted readings and inaccurate measurements. Thus, a system to correct for such errors is desirable.

SUMMARY

Disclosed herein are systems and methods to correct and/or compensate for imaging error in a video extensometer system. These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

The figures are not necessarily to scale. Where appropriate, similar or identical reference numbers are used to refer to similar or identical components.

DETAILED DESCRIPTION

Figure 2:
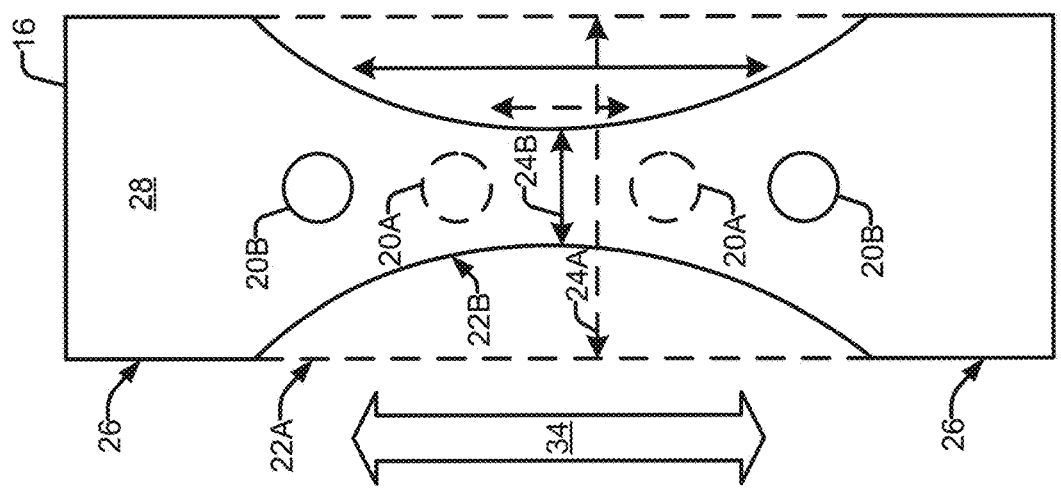
FIG. 2 is an example test specimen for measurement in the extensometer system of FIG. 1, in accordance with aspects of this disclosure.

The present disclosure describes systems and methods to compensate for error in a video extensometer system, including noise, perspective variations, and/or component placement and/or operation.

In particular, disclosed examples provide systems and methods to address noise by employment of fluid delivery systems, vibration control systems, and/or saturation control in a video extensometer system. Further, disclosed examples provide systems and methods to address imaging challenges by employing multiple cameras in a video extensometer system. Further, disclosed examples provide systems and methods to monitor changes in a test specimen by monitoring a reference pattern and/or object in a video extensometer system. Further, disclosed examples provide systems and methods to mitigate heat and/or external vibration by employment compensation techniques, including active, passive, and/or processing in a video extensometer system.

Conventional systems are subject to one or more errors in testing and measuring one or more physical characteristics of a test specimen. The errors may be attributed to system components limitations (e.g., component physical/operational limitations, operational impacts on associated components, etc.), system calibration (e.g., for measuring different materials/specimens), and/or measurement and/or analytical limitations (e.g., collection and analysis of measured characteristics, etc.).

Some conventional testing systems employ camera based vision systems to capture information (e.g., measurements of one or more characteristics or geometric variable) during a material testing process (e.g., to determine strain of the test specimen). Such systems may capture multiple images of the test specimen and synchronize these images with other information associated with the testing process (e.g., specimen load, machine actuator/crosshead displacement, etc.). The images of the test specimen can then be analyzed via one or more algorithms to identify and/or locate specific features of the test specimen (including reference features), as well as track such features as the testing operation progresses. A change in an absolute and/or relative location of such features allows local specimen deformation to be calculated and, in turn, specimen strain to be computed.

Specimen features of interest may consist of markings (e.g., reference features) applied to a surface of the test specimen visible to the camera(s). For example, a processor can analyze the image to determine the location and/or geometry (and any change thereof) of the markings, and to track these marks as they move relative to one another during the test. Multiple markings may exist on the front face of the specimen—for example pair groupings for determination of gage length-based strain measurement (axial marks, transverse marks etc.), or quasi random speckle patterns used with Digital Image Correlation (DIC) techniques. An alternative set of features that may be of interest for determination of transverse specimen strain are the edges of the test specimen.

For single or multiple camera measurement systems, a calibration process can be performed on a selected calibration plane arranged a predetermined distance from the image sensor. The calibration process establishes the relationship between one or more characteristics (e.g., a size, position, width, etc.) as captured by the imaging device and one or more physical characteristics (e.g., determined in physical coordinates) on the calibration plane.

Such a calibration process may employ a calibration reference device positioned on the calibration plane. The reference device includes predetermined physical characteristics with known geometric dimensions associated with covering some or all of the Field of View (FOV) of interest. The calibration process enables the image of the calibration device to be captured and compared to the known calibration device geometry, with a transfer function being established to convert the image co-ordinates from the pixel co-ordinate system to real-world physical co-ordinate system.

Conventional video extensometer systems track and measure dimensions and/or relative location of markings on a surface of the test specimen. During a testing process, image processing algorithms are executed (e.g., via a processor of the video extensometer system) to determine the locations of the markings on the surface of the specimen. Based on the determined locations, the processor may calculate the initial specimen gauge length as well as instantaneous changes in specimen gage length from the value(s) at initiation of the test specimen (e.g., axial and/or transverse strain). The accuracy with which the video extensometer system is able to measure absolute and/or relative positions and/or changes in positions of markings is dependent at least in part, on whether the surface of the specimen is coplanar with the initial calibration plane. Differences between the locations of the measurement plane (corresponding to the surface of the test specimen) and the calibration plane (corresponding to a reference plane) will produce measurement errors (e.g., perspective errors). As deviations between the measurement and reference planes increase (e.g., along a Z-axis between the test specimen and the camera), larger measurement errors result.

In some examples, multiple test specimens are subjected to a testing process following a calibration process, with each specimen having a different thickness, and/or the thickness of a test specimen changes during testing. As a result, the distance between the surface of the specimen and the imaging device will change during a testing process and/or with each specimen.

Such perspective errors may be more problematic in materials testing applications where measurements of absolute dimensions are sought versus, for example, testing applications where measurements are used to determine proportional (e.g., ratiometric) strain. In proportional strain determinations, perspective error results in similarly proportioned errors in initial gauge length measurements and/or strain displacement measurements. Since strain is calculated as displacement over gage length, the perspective errors cancel out since they exist in both the numerator and denominator. These perspective errors may also impact accuracy with smaller strains, where perspective errors can become dominant over an intended strain measurement signal.

Conventional systems attempted to mitigate some of these issues by a variety of techniques, each with significant shortcomings. One option is to a calibration plane arranged in an average or middle plane of all the testing planes of interest, such that perspective measurement errors are optimized across the specimens with different thicknesses. Another option is to make physical adjustments to the test specimen mounting position of the extensometer to compensate for different test specimens in an attempt to maintain a single working distance equal to the calibration plane. Yet another option is to use telecentric optics that are much less sensitive to out of plane perspective errors, yet are more expensive and have a more limited Field of View. In yet another option, multiple cameras can be employed to capture perspective information from different angles, which can be incorporated into a calibration and specimen measurement process.

However, existing solutions to mitigate perspective errors encountered in video extensometer systems all have drawbacks. For instance, using an average distance for the calibration plane and/or using less accurate measurement equipment necessarily yields less accurate measurements. Making manual adjustments of the extensometer mounting position to compensate for different specimen thicknesses is time consuming and requires an operator to remember to make multiple, different adjustments consistently for each specimen based on its individual thickness. Furthermore, such adjustments are difficult to automate.

Telecentric optics are large, heavy and expensive and have limited Fields of View (FOV). Accordingly, video extensometer systems utilizing multiple cameras are expensive, complex, and require extensive three-dimensional calibration processes and equipment.

The disclosed systems and methods mitigates systematic and deterministic errors in a video extensometer that arise from changes in the Z-axis distance, changes in a measurement plane relative to a calibration plane, errors from external noise, including heat and vibration, as a list of non-limiting examples. In some examples, the errors are corrected in real-time during a testing process.

As described herein, material testing systems, including material testing systems that apply tension, compression, and/or torsion, include one or more components that incur displacement and/or load bearing to apply and/or measure stresses on a test specimen. In some examples, a video extensometer system is employed in specimen strain testing, which can include one or more of collecting high resolution images, providing the images to an image processor, analyzing the images to identify one or more specimen characteristics corresponding to displacement or strain value, and generating an output corresponding to the characteristics.

Video processing that employs extensometers may include an external machine vision imaging device connected to a processing system or computing platform and/or video processing hardware and use software and/or hardware to convert the data from the camera to an electrical signal or having a software interface compatible with the materials testing system.

As disclosed herein, image devices employing camera based image capture (e.g., vision or video) systems are implemented in materials testing systems for measurement of strain on the test specimen. Such systems collect multiple images of the specimen under test (i.e. during a testing process), with the images being synchronized with other signals of interest for the test (such as specimen load, machine actuator and/or crosshead displacement, etc.). The images of the specimen are analyzed (e.g., in real-time and/or post-test) by algorithms to locate and track specific specimen characteristics as the test progresses. For instance, a change in a location, size, shape, etc., of such characteristics allows for test specimen deformation to be calculated, which leads in turn to analysis and calculation of specimen strain.

Accordingly, the systems and methods disclosed herein compensate for error in a video extensometer system, including noise, perspective variations, and/or component placement and/or operation.

In disclosed examples, a system for correcting for errors during a test process in a video extensometry system, the system including a testing system to secure a test specimen; an imaging device arranged to capture images of a surface of the test specimen; one or more sensors configured to measure one or more parameters associated with the test specimen; and a processing system to: receive image data from the imaging device; receive sensor data from the one or more sensors; compare the image data or the sensor data to one or more data threshold values; calculate a correction factor based in part on the image data and the sensor data in response to the image data or the sensor data violating the one or more data threshold values; and command an adjustment of the imaging device and a system component based at least in part on the correction factor.

In some examples, the system component is an active cooler, an actuator, or an imaging device position system. In examples, the imaging device is a single view camera. In examples, the imaging device is two or more cameras.

In some examples, the sensor is an accelerometer, an inertial measurement unit, a temperature sensor, an infrared sensor, a light emitting diode sensor, an ultrasonic sensor, or a laser enabled sensor. In examples, the one or more parameters comprises one or more of a shape or position of the markings, an edge position of the test specimen, or a width of the test specimen. In examples, the correction factor is in one of millimeters, inches, or pixel units.

In some examples, the processing system is located with a remote computing platform in communication with one or more of the testing system or the imaging device. In examples, the processing system is integrated with one of the imaging device or the testing system.

In some disclosed examples, a system for correcting for errors during a test process in a video extensometry system, the system includes a testing system to secure a test specimen; an imaging device arranged to capture images of a surface of the test specimen; one or more motion sensors configured to measure one or more movement parameters associated with the video extensometry system; one or more actuators to adjust a position or orientation of the imaging device; and a processing system to: receive image data from the imaging device; receive sensor data corresponding to vibration measurements from the one or more motion sensors; compare the image data or the sensor data to one or more data threshold values; calculate a correction factor based in part on the image data and the sensor data in response to the sensor data violating the one or more data threshold values; and command the one or more actuators to adjust the position or the orientation of the imaging device based at least in part on the correction factor.

In some examples, the one or more motion sensors includes an accelerometer, an inertial measurement unit, a vibration sensor, or a tilt sensor. In examples, the one or more motion sensors are arranged near the one or more image sensors to monitor and measure vibrations at the one or more image sensors.

In some examples, the one or more data threshold values correspond to one or more data threshold vibration values, the processing system is further operable to correlate image data with vibration measurements that violate the one or more threshold vibration values. In examples, the processing system is further operable to apply the compensation factor to the image data at the correlated data points that exceed the one or more threshold vibration values to correct for excess vibration.

In some examples, the system includes a drive and control system to receive instructions from the processing system to control the one or more actuators. In examples, the actuators 104 can include a piezo actuator with a mechanical amplifier.

In some examples, the measurements and compensation calculations can be performed in real-time during an imaging operation. In examples, active vibration control can be implemented in concert with image data compensation.

In some examples, the processing system is located with a remote computing platform in communication with one or more of the testing system or the imaging device. In examples, the imaging device comprises two or more imaging devices, each imaging device operable to capture images of the surface of the test specimen.

Figure 1:
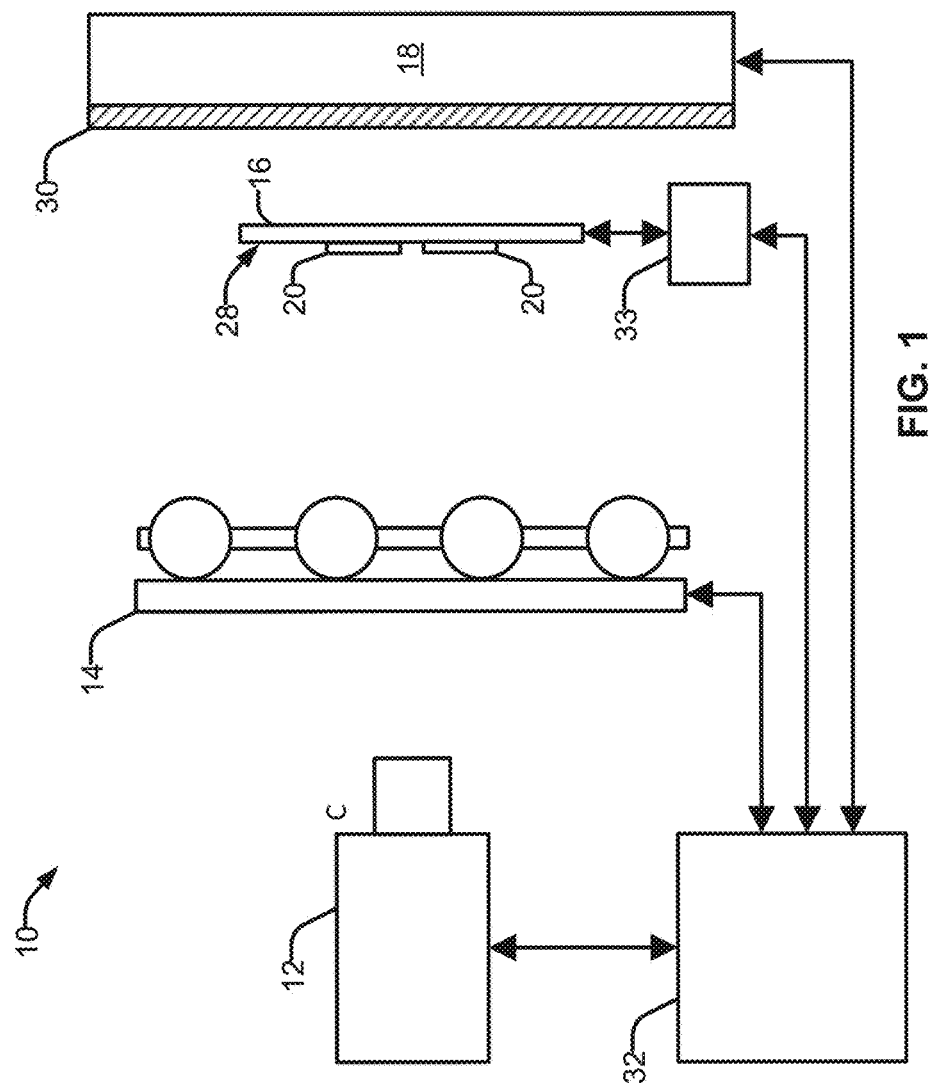
FIG. 1 is a block diagram of an example extensometer system, in accordance with aspects of this disclosure.

Referring now to the figures, FIG. 1 is an example extensometer system 10 to measure changes to one or more characteristics of a test specimen 16 undergoing a mechanical property testing. The example extensometer system 10 may be connected to, for example, a testing system 33 capable of mechanical testing of the test specimen 16. The extensometer system 10 may measure and/or calculate changes in the test specimen 16 subjected to, for example, compression strength testing, tension strength testing, shear strength testing, bend strength testing, deflection strength testing, tearing strength testing, peel strength testing (e.g., strength of an adhesive bond), torsional strength testing, and/or any other compressive and/or tensile testing. Additionally, or alternatively, the material extensometer system 10 may perform dynamic testing.

Figure 4:
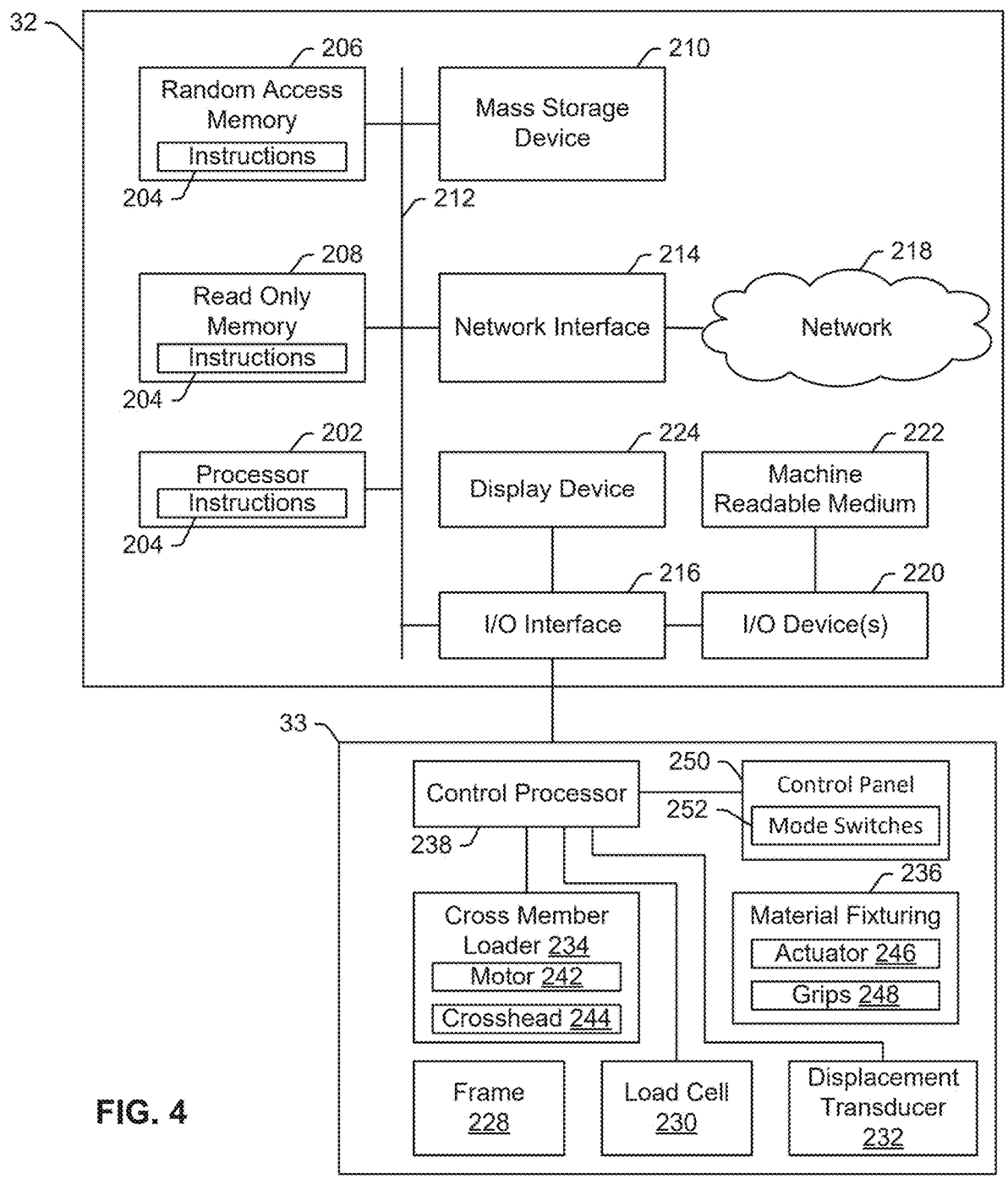
FIG. 4 is a block diagram of an example implementation of the extensometer system of FIG. 1, in accordance with aspects of this disclosure.

In accordance with disclosed examples, the extensometer system 10 may include the testing system 33 for manipulating and testing the test specimen 16, and/or a computing device or processing system 32 communicatively coupled to the testing system 33, the light source, and/or the imaging device, as further shown in FIG. 4. The testing system 33 applies loads to the test specimen 16 and measures the mechanical properties of the test, such as displacement of the test specimen 16 and/or force applied to the test specimen 16.

The extensometer system 10 includes a remote and/or an integral light source 14 (e.g., an LED array) to illuminate the test specimen 16 and/or a reflective back screen 18. The extensometer system 10 includes a processing system 32 (see also FIG. 4) and a camera or imaging device 12. Although the example of FIG. 1 illustrates a single camera 12, disclosed examples are applicable to multiple camera extensometer systems 10. In some examples, the light source 14 and the imaging device 12 are configured to transmit and receive in the infrared (IR) wavelengths; however, other illumination sources and/or wavelengths are similarly applicable. In some examples, one or both of the light source 14 or the imaging device 12 include one or more filters (e.g., a polarizing filter), one or more lenses. In some examples, a calibration routine is performed (e.g., a two-dimensional calibration routine) to identify one or more characteristics of the test specimen 16, one or more markers 20 (including a pattern of markers), is additionally used.

In disclosed examples, the computing device 32 may be used to configure the testing system 33, control the testing system 33, and/or receive measurement data (e.g., transducer measurements such as force and displacement) and/or test results (e.g., peak force, break displacement, etc.) from the testing system 33 for processing, display, reporting, and/or any other desired purposes. The extensometer system 10 connects to the testing system 33 and software utilizing standard interfaces that includes Ethernet, analog, encoder or SPI. This allows the device to be plugged into and used by existing systems without the need for specialized integration software or hardware. The extensometer system 10 provides axial and transverse encoder or analog information in real-time to materials testing machine 33. Real-time video extensometer 10 and materials testing machine 33 exchange real-time test data, including extension/strain data, with the external computer 32, which may be configured via a wired and/or wireless communications channel. The extensometer system 10 provides measurement and/or calculation of extension/strain data captured from the test specimen 16 subjected to testing in the materials testing machine 33, which in turn, provides stress and extension/strain data to the processor 32.

As disclosed herein, the captured images are input to the processor 32 from the imaging device, where one or more algorithms and/or look up tables are employed to calculate multiple axes of extension/strain values for the test specimen 16 (i.e., the change or percentage change in inter-target distance as calculated by image monitoring of the markers 20 affixed to the test specimen 16). Following computation, the data may be stored in memory or output to a network and/or one or more display devices, I/O devices, etc. (see also FIG. 4).

FIG. 2 is an example test specimen 16 for measurement in the extensometer system 10 of FIG. 1. For example, one or more markings 20 (e.g., reference features) are applied to the surface 28 facing the light source 14 and imaging device 12. Grip sections 26 are configured for placement within a grip of the testing system 33 (see also FIG. 4), and apply force to the test specimen 16. For example, a cross-member loader applies force to the specimen 16 under test, while the grips grasp or otherwise couple the test specimen 16 to the testing system 33. A force applicator such as a motor causes the crosshead to move with respect to the frame to apply force to the test specimen 16, as illustrated by double arrow 34. Forces 34 pulling the grip sections 26 away from one another may elongate the test specimen 16, resulting in the markings moving from a first position 20A to a second position 20B. Additionally or alternatively, the markings may change shape or size, which may also be measured by the processing system 32 in view of the captured images. The forces 34 may also cause the edges of the test specimen to move from a first position 22A to a second position 22B. For example, at the first or initial position, the edges have a width 24A, which is reduced to width 24B upon application of the forces 34.

Based on the captured images, the processing system 32 is configured to implement an extension/strain on measurement process. For example, to detect an extension/strain on the test specimen 16, the processing system 32 monitors the images provided via the imaging device 12. When the processing system 32 identifies a change in relative position between two or more of the markers and/or the edges of the test specimen 16 (e.g., compared to an initial location at a beginning of movement of the crosshead), the processing system 32 measures the amount of change to calculate the amount of extension and/or strain on the test specimen 16. As disclosed herein, the markers are configured to reflect light from the light source to the camera, whereas the back screen reflects light to create a dark silhouette for edge analysis.

As disclosed herein, the video extensometer system 10 is configured to perform optical width measurement of non-transparent test specimen 16. The imaging device 12 is arranged to observe the surface 28 of the test specimen 16 that is facing the imaging device 12, the surface 28 being close to a focal plane of the imaging device optics (see, e.g., FIG. 3).

Figure 3:
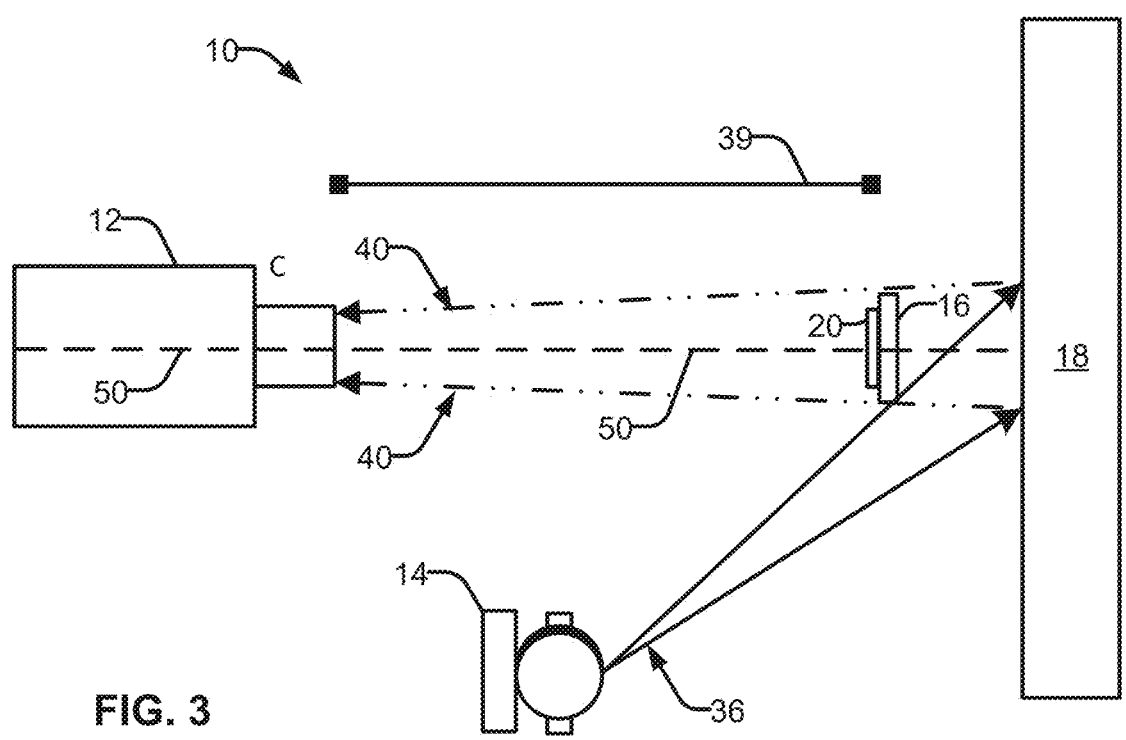
FIG. 3 is a block diagram of an alternate view of the example extensometer system of FIG. 1, in accordance with aspects of this disclosure.

As show in FIG. 3, a video extensometer system 10 is arranged to measure one or both of axial strain (based on changes in markers 20 and/or a pattern of markers on the test specimen 16 front surface 28), and transverse strain (calculated from changes in width of the specimen 16). The components of the video extensometer system 10 are shown in a top perspective in FIG. 3, with general locations of each component relative to the others. As shown, the components include an imaging device 12 (e.g., a video camera) configured to capture one or more images of the test specimen 16 during the physical test (e.g., at regular intervals, continuously, and/or based on one or more threshold values associated with time, force, or other suitable test characteristic).

As shown, the imaging device 12 and test specimen 16 are arranged at a working distance or Z-axis distance 39, which during the testing process may be static, predetermined, and/or changing.

The test specimen 16 features suitable marks or reference features 20 on the front facing surface 28 (and/or opposing surface) of the test specimen 16. Analysis of the one or more images associated with the video extensometer system 10 is implemented via processing system 32 to perform identification algorithms that allow both the test specimen 16 markings 20 and the test specimen edges 22 to be continuously tracked and measured during the test process.

In the illustrated example, the imaging device 12 is a single view camera with a single optical axis 50. In some examples, two or more imaging devices may be employed, which may be collocated and/or arranged with different viewing angles of the testing specimen 16. By employing stereo imaging arrangements, measurement variables associated with perspective and/or depth of multiple dimensions of the test specimen 16 may also be used to further calibrate and/or measure characteristics of the test specimen 16.

In some examples, the measurements and/or position of the one or more edges are provided in pixel coordinates, as captured by the imaging device 12. Additionally or alternatively, the measurements and/or position of the one or more edges are provided in other standard coordinate systems/units, such as meters. In such an example, a calibration process can be implemented to determine absolute and/or relative placement and/or dimensions of the test specimen within the test system prior to measurement, and a similar coordinate system/units can be employed during a testing process.

FIG. 4 is a block diagram of an example extensometer system 10 of FIG. 1. As shown in FIG. 1, the extensometer system 10 includes the testing system 33 and the computing device 32. The example computing device 32 may be a general-purpose computer, a laptop computer, a tablet computer, a mobile device, a server, an all-in-one computer, and/or any other type of computing device. The computing device 32 of FIG. 4 includes a processor 202, which may be a general-purpose central processing unit (CPU). In some examples, the processor 202 may include one or more specialized processing units, such as FPGA, RISC processors with an ARM core, graphic processing units, digital signal processors, and/or system-on-chips (SoC). The processor 202 executes machine-readable instructions 204 that may be stored locally at the processor (e.g., in an included cache or SoC), in a random access memory 206 (or other volatile memory), in a read-only memory 208 (or other non-volatile memory such as FLASH memory), and/or in a mass storage device 210. The example mass storage device 210 may be a hard drive, a solid-state storage drive, a hybrid drive, a RAID array, and/or any other mass data storage device. A bus 212 enables communications between the processor 202, the RAM 206, the ROM 208, the mass storage device 210, a network interface 214, and/or an input/output interface 216.

An example network interface 214 includes hardware, firmware, and/or software to connect the computing device 201 to a communications network 218 such as the Internet. For example, the network interface 214 may include IEEE 202.X-compliant wireless and/or wired communications hardware for transmitting and/or receiving communications.

An example I/O interface 216 of FIG. 4 includes hardware, firmware, and/or software to connect one or more input/output devices 220 to the processor 202 for providing input to the processor 202 and/or providing output from the processor 202. For example, the I/O interface 216 may include a graphics-processing unit for interfacing with a display device, a universal serial bus port for interfacing with one or more USB-compliant devices, a FireWire, a field bus, and/or any other type of interface. The example extensometer system 10 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The computing device 32 may access a non-transitory machine-readable medium 222 via the I/O interface 216 and/or the I/O device(s) 220. Examples of the machine-readable medium 222 of FIG. 4 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine-readable media.

The extensometer system 10 further includes the testing system 33 coupled to the computing device 32. In the example of FIG. 4, the testing system 33 is coupled to the computing device via the I/O interface 216, such as via a USB port, a Thunderbolt port, a FireWire (IEEE 1394) port, and/or any other type serial or parallel data port. In some examples, the testing system 33 is coupled to the network interface 214 and/or to the I/O interface 216 via a wired or wireless connection (e.g., Ethernet, Wi-Fi, etc.), either directly or via the network 218.

The testing system 33 includes a frame 228, a load cell 230, a displacement transducer 232, a cross-member loader 234, material fixtures 236, and a control processor 238. The frame 228 provides rigid structural support for the other components of the testing system 33 that perform the test. The load cell 230 measures force applied to a material under test by the cross-member loader 234 via the grips 248. The cross-member loader 234 applies force to the material under test, while the material fixtures 236 (also referred to as grips) grasp or otherwise couple the material under test to the cross-member loader 234. The example cross-member loader 234 includes a motor 242 (or other actuator) and a crosshead 244. As used herein, a "crosshead" refers to a component of a material testing system that applies directional (axial) and/or rotational force to a specimen. A material testing system may have one or more crossheads, and the crosshead(s) may be located in any appropriate position and/or orientation in the material testing system. The crosshead 244 couples the material fixtures 236 to the frame 228, and the motor 242 causes the crosshead to move with respect to the frame to position the material fixtures 236 and/or to apply force to the material under test. Example actuators that may be used to provide force and/or motion of a component of the extensometer system 10 include electric motors, pneumatic actuators, hydraulic actuators, piezoelectric actuators, relays, and/or switches.

While the example testing system 33 uses a motor 242, such as a servo or direct-drive linear motor, other systems may use different types of actuators. For example, hydraulic actuators, pneumatic actuators, and/or any other type of actuator may be used based on the requirements of the system.

Example grips 236 include compression platens, jaws or other types of fixtures, depending on the mechanical property being tested and/or the material under test. The grips 236 may be manually configured, controlled via manual input, and/or automatically controlled by the control processor 238. The crosshead 244 and the grips 236 are operator-accessible components.

The extensometer system 10 may further include one or more control panels 250, including one or more mode switches 252. The mode switches 252 may include buttons, switches, and/or other input devices located on an operator control panel. For example, the mode switches 252 may include buttons that control the motor 242 to jog (e.g., position) the crosshead 244 at a particular position on the frame 228, switches (e.g., foot switches) that control the grip actuators 246 to close or open the pneumatic grips 248, and/or any other input devices to control operation of the testing system 33.

The example control processor 238 communicates with the computing device 32 to, for example, receive test parameters from the computing device 32 and/or report measurements and/or other results to the computing device 32. For example, the control processor 238 may include one or more communication or I/O interfaces to enable communication with the computing device 32. The control processor 238 may control the cross-member loader 234 to increase or decrease applied force, control the fixture(s) 236 to grasp or release a material under test, and/or receive measurements from the displacement transducer 232, the load cell 230 and/or other transducers.

The example control processor 238 is configured to implement an extension/strain measurement process when a test specimen 16 is subjected to testing in the testing system 33. For example, to detect an extension/strain on the test specimen 16, the control processor 238 monitors the images provided via the imaging device 12. When the control processor 238 identifies a change in location and/or position of the edges 22 of the test specimen 16 (e.g., compared to an initial location at a beginning of movement of the crosshead 244), the control processor 238 measures the amount of change to calculate the amount of extension and/or strain on the test specimen 16. For example, real-time video provided by the imaging device 12 captures the absolute position of edges 22, and monitors their relative movement over the course of the several images to calculate extension/strain in real time. The stress data and the strain data exchanged among the real-time video extensometer 10, the testing system 33 and the processing system 32, and typically organized and displayed via the display device 224.

Fluid Delivery, Vibration Control, Vibration Compensation, Saturation Control Fluid Delivery Some example systems operate in an environment that includes the imaging device or camera, lighting, a testing platform, and specimen. Operation of the system may generate heat, and/or receive heat from the environment, which may result in a temperature differential within the testing environment. For example, a thermal boundary layer may form within the air near the lens (and/or at one or more locations between the lens and the test specimen), resulting in air having varying densities in the region directly in front of the lens (and/or at one or more locations between the lens and the test specimen). This, in turn, increases the likelihood of measurement errors arising from light distorting effects (e.g., "miraging" errors, light refraction, etc.) during an imaging operation.

Figure 5A:
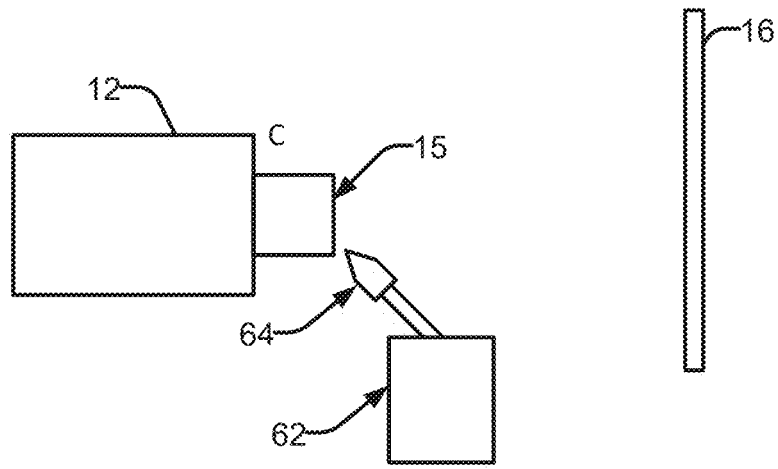
FIGS. 5A to 5E are block diagrams of example extensometer systems, in accordance with aspects of this disclosure.

In some disclosed examples, as shown in FIG. 5A, a directed gas outlet 64 (e.g., a fluid discharge device, an air/gas nozzle, an air/gas knife, etc.) provides one or more gases/fluids from a fluid source 62 to displace, mitigate, regulate, and/or shed the air and the resulting thermal boundary layer (hot and/or cold). In this manner, the gas outlet 64 can mix the air in front of the lens with environmental air in the test area. As a result, variations of air density (e.g., temperature differential) is lessened, which reduces the possibility of miraging errors.

In some examples, by moving and/or mixing the air (at or near the lens, between the lens and the test specimen, etc.), employment of the gas outlet 64 may increase a frequency associated with observed noise during an imaging operation. The increased frequency allows for facilitated filtering (e.g., via digital filters, software and/or hardware filter, etc.) to remove noise effects from processed data (e.g., imaging measurements, etc.).

In some examples, employment of the gas outlet 64 serves to redistribute air of varying temperatures, including by applying gas/air at a temperature within a threshold amount of the ambient temperature. Moreover, application of gas/air may cleanse the lens of dust, particulates, condensate, and/or other objects (e.g. insects) that may adhere to the lens.

Active Vibration Control—A

Some example systems operate in an environment that includes cooling fans, as well as external sources that may impact operation of system components, such as the camera, lighting, a testing platform and specimen. Operation of the system may create vibrations, which may result in movement of the image sensor/lens relative to the specimen which, in turn, results in noisy image data during a testing process. Of significant impact to test data are vibration modes that do not produce common mode effects.

Figure 5B:
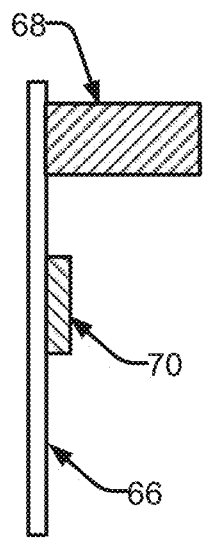

In disclosed examples, as shown in FIG. 5B, an active vibration cancellation unit 68 may be mounted within the system to mitigate vibration local to an image sensor 70, thereby reducing vibrations and/or induced noise on the image signal.

In some examples, one or more linear and/or rotational axes can be measured and/or mitigated. For instance, one or more sensors may be employed (e.g., to gauge acceleration, optical adjustments, etc.), with a plurality of associated actuators to respond to vibration in each of the monitored axes.

In alternative or additional examples, a tuned mass damper system (e.g., a passive system) can be employed with (or substituted for) the active vibration cancellation module.

Active Vibration Control—B

Figure 5C:
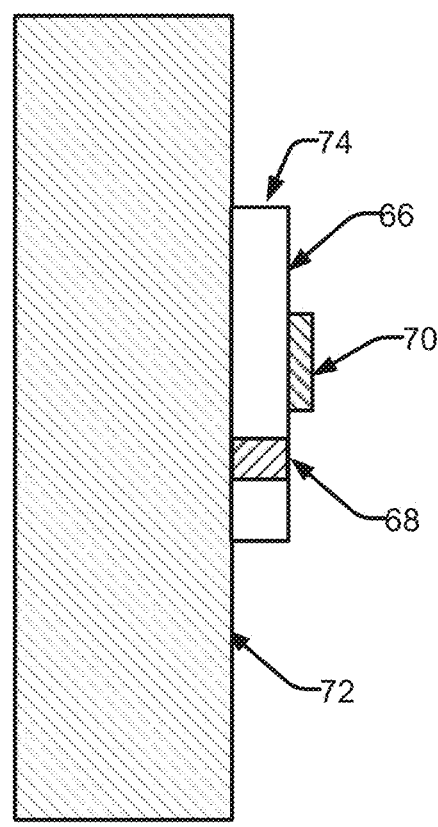

In an additional or alternative example, as shown in FIG. 5C, a PCB 66, upon which the image sensor 70 is mounted, is itself mounted to another substrate 72 or housing wall. An active vibration cancellation unit 68 can be mounted with the PCB 66, PCB mounting fasteners 74, and/or between the PCB 66 and the PCB mounting fastener 74. In accordance with disclosed examples, the active vibration cancellation unit 68 can respond to vibration (e.g., based on a motion sensor feedback, etc.) to mitigate vibration local to the image sensor 70, reducing induced noise on the image signal.

Furthermore, in some examples, the active vibration cancellation unit 68 can operate simultaneously with, and/or be replaced by, a tuned mass damper system. As used herein, a tuned mass damper system (e.g., a harmonic absorber or seismic damper), is a device or system that can be connected to or otherwise mounted to the PCB 66 and/or the substrate 72, and is used to reduce vibrations. A tuned mass damper system may include a massive element mounted on a damped springs, with an oscillation frequency tuned similar to a resonant frequency of the system during operation.

Active Vibration Compensation

Figure 5D:
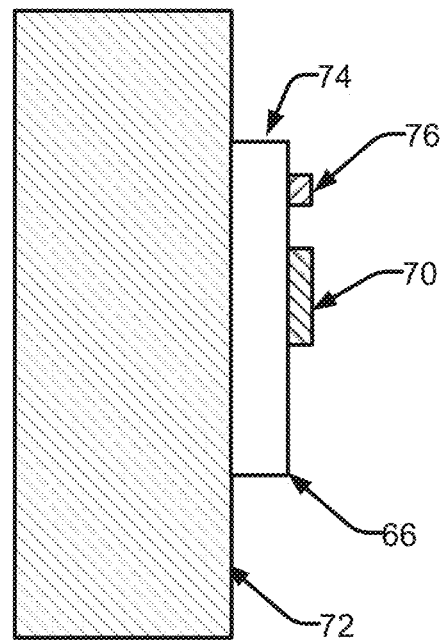

In an additional or alternative example, as shown in FIG. 5D, a motion sensor 76 (e.g., inertial measurement unit, accelerometer, etc.) can be mounted with the PCB 66, such as arranged near the image sensor 70 (e.g., on a common surface of the PCB 66, on the opposite surface, etc.). In some examples, measurements from the motion sensor 76 are provided to control circuitry or other processor (e.g., processing system 32, processor 202, control processor 238, etc.). The processing system 32 correlates timing of the imaging process to the measurements from the motion sensor 76. If a measurement from the motion sensor 76 exceeds a filter threshold (e.g., based on physical movement, data/image collection tolerance, etc.) for example, the processing system 32 can compensate for error from excess movement, such as by firmware, software, and/or hardware techniques.

Illumination Compensation

Some example systems operate are configured to optimize lighting applied to the system to meet specific illumination criteria. For example, sufficient lighting at the test specimen reduces noise and/or imaging error during an imaging operation.

In some systems, the amount of illumination (e.g., intensity, level of saturation, etc.) is fixed, limited to manual adjustment of the light source, and/or cannot be adjusted during the imaging operation. A reduction in image accuracy and precision can result from the above limitations, due to non-optimal lighting conditions, including image saturation, for example.

Figure 5E:
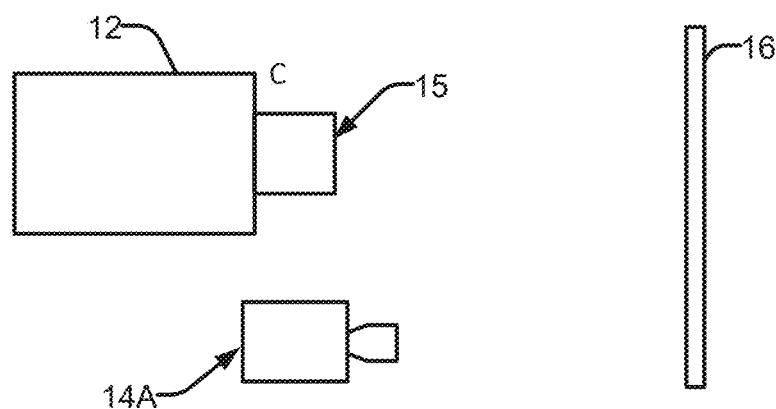

To address these shortcomings, disclosed systems, as shown in FIG. 5E, are configured to measure image saturation of each test specimen 16 prior to test operation initiation. As the image operation progresses, image data is analyzes (e.g., at camera 12 via an image sensor 70, at processing system 32, etc.) and compared against one or more threshold values (e.g., light intensity at the image, etc.). In response to violating a threshold value, the intensity of the light source 14A can be automatically adjusted to provide a desired level of image saturation for the specimen under test. In some examples, one or more photosensitive sensors are employed (e.g., at the test specimen 16, at the camera 12, etc.) to measure light intensity, which can be employed by the processing system 32 to determine adjustment values for the light source.

Z-Axis Movement

In some video extensometer systems, the optical axis from the camera to the specimen being measured is referred to as the "Z-axis" and the test specimen is imaged in the X-Y plane. When using entocentric lenses, measured changes in the distance between the camera and the test specimen will alter the imaged dimensions of the test specimen. In the case of a video extensometer, which measures displacement between multiple reference features (e.g., two, four, etc.), changes in the specimen Z-axis position will cause changes in the imaged dimensions between the reference points unrelated to the test operation, leading to errors in strain measurement, for example. However, disclosed examples provide a plurality of methods and systems to reduce and/or eliminate errors associated with Z-axis errors.

Telecentric Lens

In some example systems, a video extensometer system employs one or more conventional optical lenses with angular fields of view. As a result, imaging can suffer from parallax errors, increasing or decreasing magnification of the test specimen being measured as that object moves toward or away from the lens. In disclosed examples, a video extensometer system employing one or more telecentric lenses mitigates this error by having a non-angular and constant field of view.

Figure 7A:
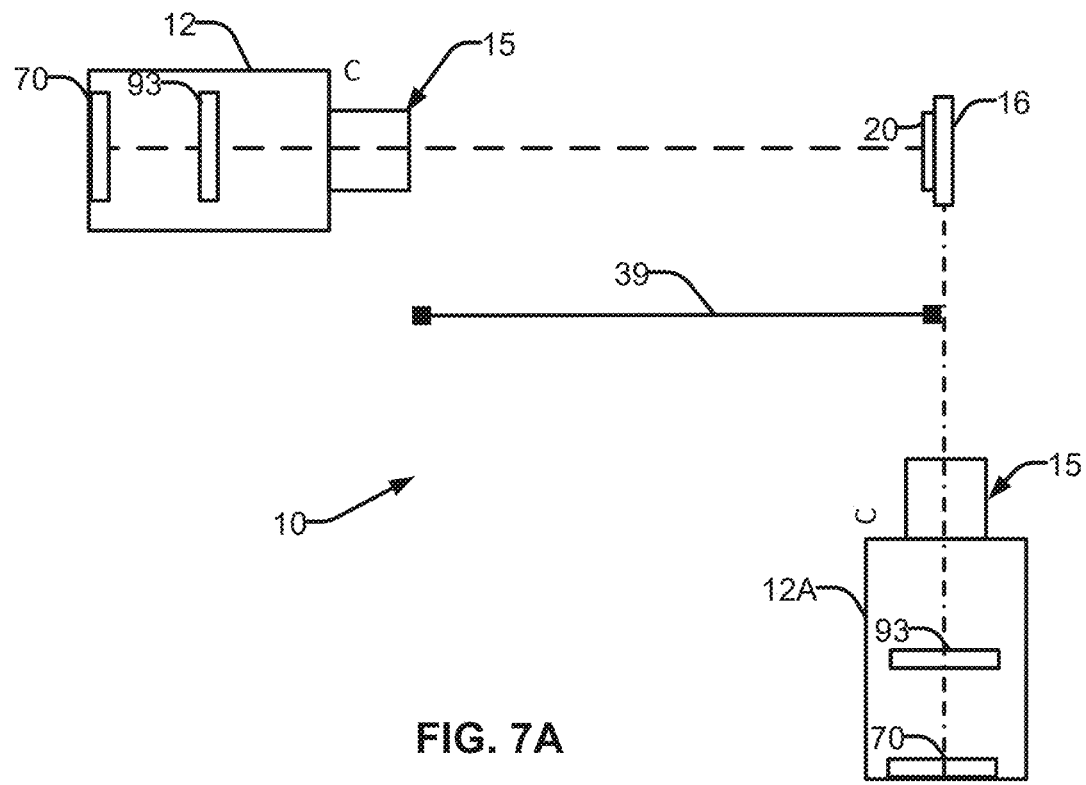
FIGS. 7A to 7H are block diagrams of example extensometer systems, in accordance with aspects of this disclosure.
Figure 7B:
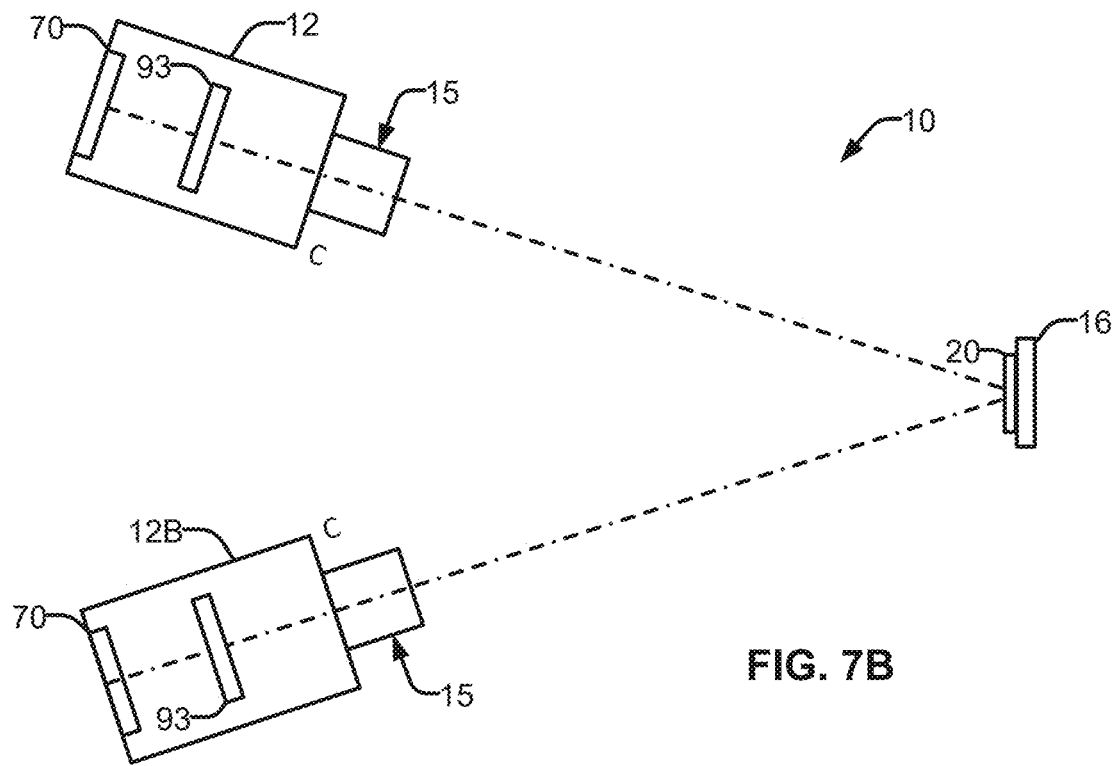
Figure 7C:
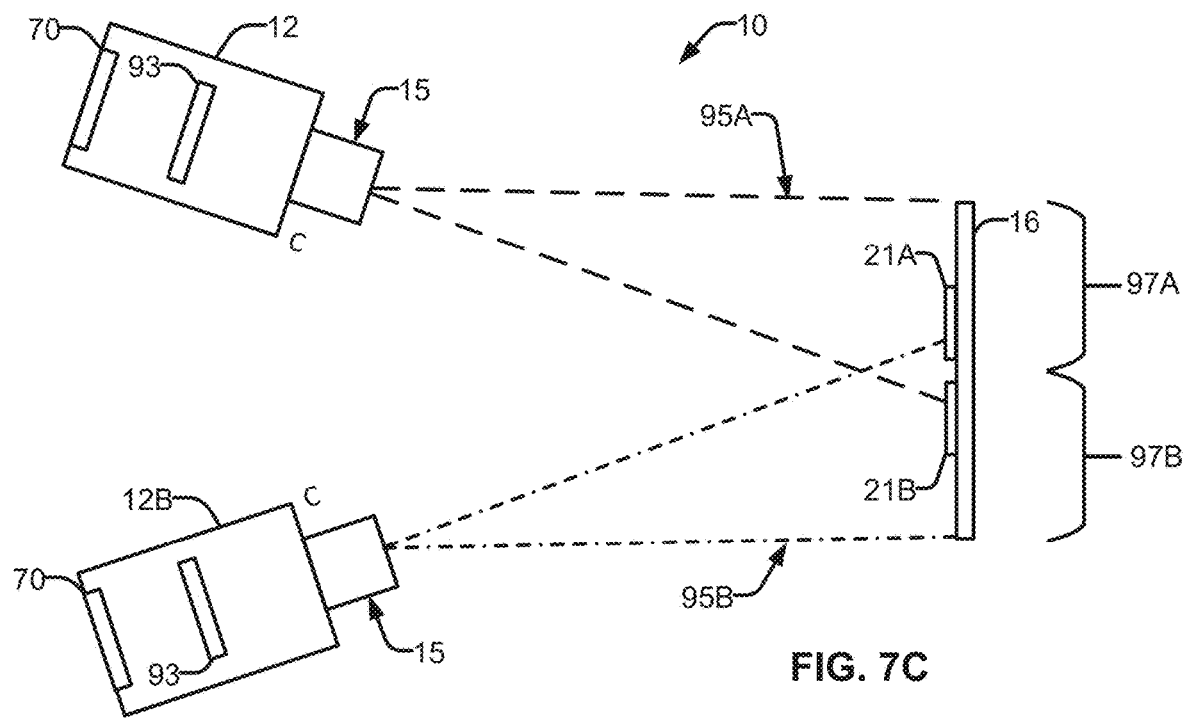
Figure 7F:
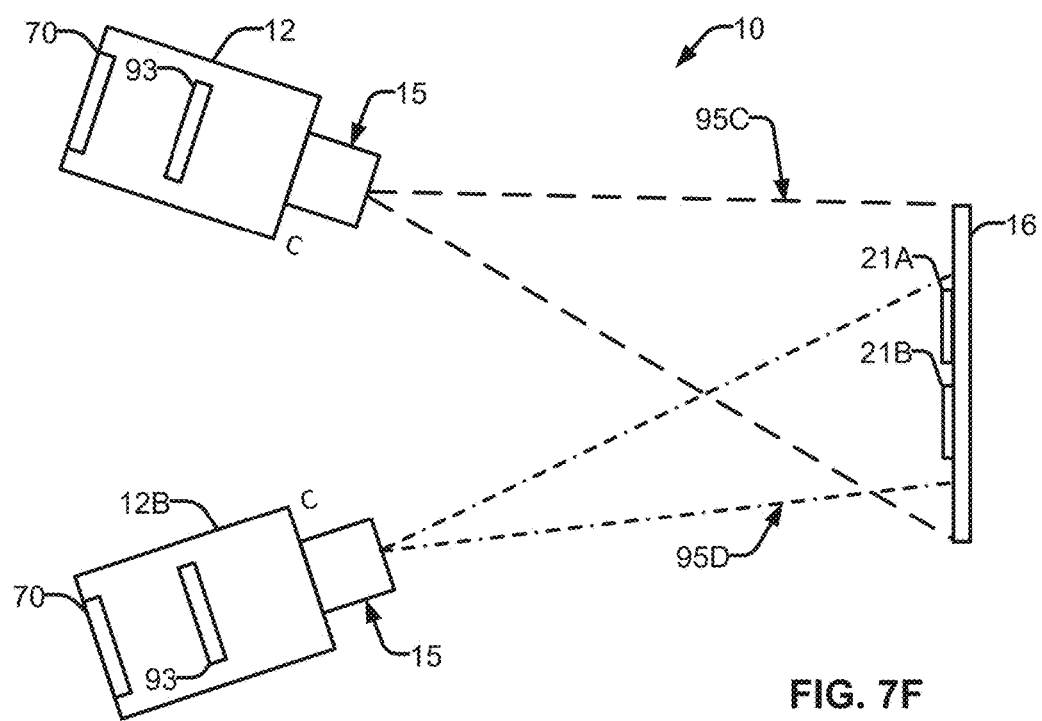

In some disclosed examples, the video extensometer system employs two or more cameras, with at least one camera fitted with a telecentric lens with a relatively small field of view (50-90 mm, e.g. camera 12B of FIG. 7F). Another camera(s) (e.g., camera 12, as shown in the figures) employs entocentric lenses with different fields of view, which may be larger than the field of view associated with the telecentric lens.

During an imaging operation, errors caused by Z-axis movement of the test specimen are generally more pronounced in initial stages of the testing process (as opposed to later stages). In the disclosed system, a first camera using a telecentric lens would not experience a change in image dimensions (e.g., with respect to one or more reference features) caused by Z-axis movement. As the strain applied to the test specimen increases (e.g., beyond a threshold amount of strain, expansion of the test specimen, time, and/or in response to a command), the system transitions to analysis using measurements taken with the remaining cameras employing entocentric lenses.

Projected Pattern

Figure 6A:
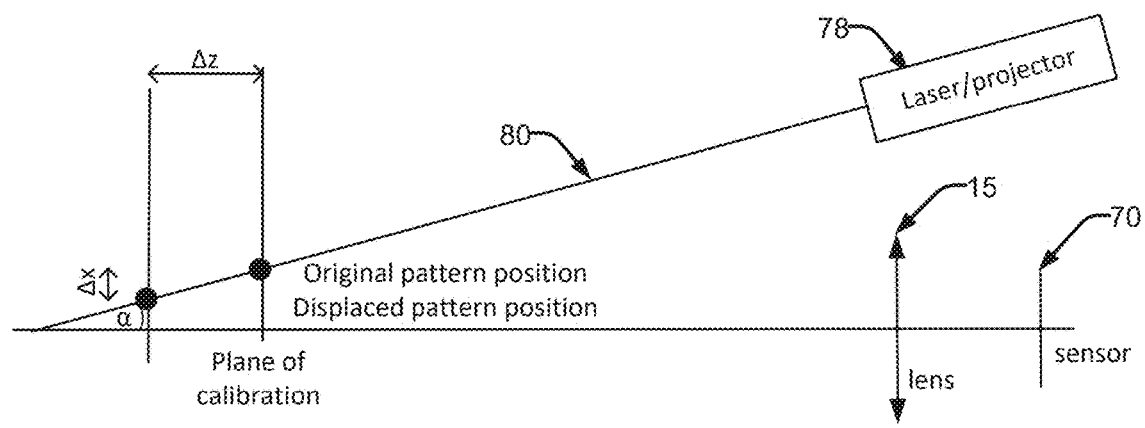
FIGS. 6A to 6C are block diagrams of example extensometer systems, in accordance with aspects of this disclosure.

In some examples, a video extensometer system can measure Z-axis movement by analyzing changes associated with a feature of the test specimen that is independent of deformation of the test specimen. For instance, an image or other feature can be projected onto the surface of the specimen under test. For example, a laser 78 and/or other type of projector can projecting a feature (e.g., dot, line, pattern, etc.) as provided in FIG. 6A. Lens 15 and image sensor 70 can measure Z-axis movement by measuring changes and/or displacement of the projected feature, such as by using a known angle α between the projected light and the surface of the test specimen.

For example, the system 10 may employ a sensor 70 to measure one or more features of the testing system 10 arrangement. For instance, the sensor 70 can employ one or more techniques (e.g., an infrared (IR) light, a light emitting diode (LED) output, an ultrasonic sensor, structured light imaging, time of flight calculations, a laser enabled sensor, etc.) to sense the measurement distance along the Z-axis between the imaging device 12 and the test specimen 16. The results can be transmitted from the sensor 70 to a processor circuitry or computing device (e.g., processing system 32 via an interface) for analysis. The processing circuitry can then generate and apply a correction factor based on a difference on the Z-axis.

Accordingly, the camera 12, image sensor 70, and processing system 32 can be utilized for both tracking reference features of the test specimen and processing measurements of the projected feature/pattern. Changes in the projected feature can be calculated at the processing system 32 to determine an amount of Z-axis movement. An error correction value can then be calculated and/or determined (e.g., by reference to a listing of corresponding Z-axis changes to compensation factors, etc.) and applied to measurements associated with respective changes to the reference feature(s) to improve test results.

Structured Lighting Projector

In an example, a projection method (e.g. digital light processing projector), can be employed to project a predetermined pattern onto a surface of the test specimen. During the imaging operation, Z-axis movement of the specimen will result in distortions of the pattern (e.g., a grid, groupings of parallel lines, etc.). Imaging and measuring geometrical deformation of the pattern therefore provides data associated with Z-axis movement. Advantageously, the deformation may provide information associated with other deformation during the test operation, such as bowing of the test specimen.

Laser Triangulation Sensor

Figure 6B:
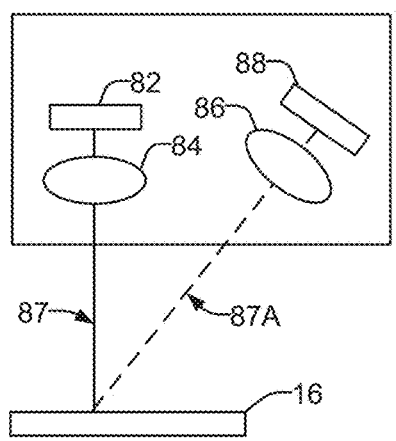

In some disclosed examples, as shown in FIG. 6B, a laser triangulation sensor(s) 88 is employed to detect Z-axis movement of the test specimen 16. For example, a laser light source 82 can generate laser light 87, directed via one or more lenses 84, toward a test specimen 16. The reflected laser light 87A is received at a light receiving element 88 (e.g., a photosensitive sensor), which is configured to generate a signal proportional to the magnitude of the Z-axis movement. The signal from the receiving element 88 is analyzed at the processing system 32 to calculate a compensation factor to correct for this movement.

For example, one or more characteristics of the received light (e.g., phase, intensity, frequency, etc.) can be correlated to a change in Z-axis.

Reference Object

Figure 6C:
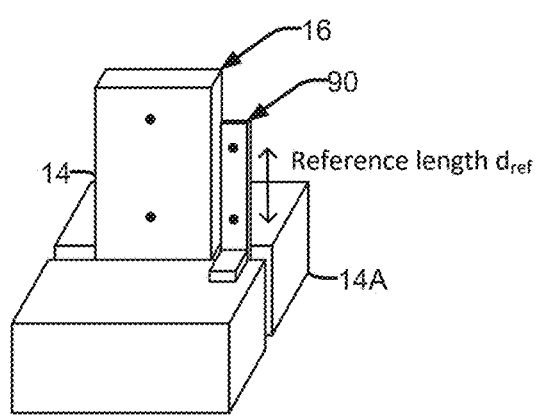

In some example systems, a reference scale object 90 can be positioned with and/or near the test specimen 16, as shown in FIG. 6C. As the test specimen 16 is put under test, absolute and/or relative positions of reference features 14 change, while the reference scale object 90, and associated reference features 14A, remain static. An image sensor 70 can capture data on the test specimen 16 and/or the reference scale object 90 during an imaging operation.

For example, any changes in the absolute and/or relative size of the reference scale object 90 is caused by Z-axis movement, which can be calculated and corrected for. Further, if Z-axis changes are detected in the test specimen 16 but not the reference scale object 90, the relative change between the two objects can be indicative of Z-axis changes to the test specimen 16, which can be calculated via the processing system 32.

Multiple Cameras

As a tool for providing high accuracy results, video extensometry systems face multiple challenges. In general, strain calculations during an extensometry test assume that measurements taken during the test are accurate measurements of the (often two-dimensional) changes to the test specimen. These dimensions are how the shape of the specimen changes in the axial dimension (the X-axis) and the transverse dimension (the Y-axis). In video extensometry, a camera provides two-dimensional measurements by locating and focusing the camera at a surface of the test specimen to directly observe changes to the X-axis and Y-axis in the specimen.

However, in an actual testing environment, there can also be changes to the Z-axis (e.g., the distance from the camera to the test specimen) that can impact the accuracy of the X and Y measurements.

Figure 7D:
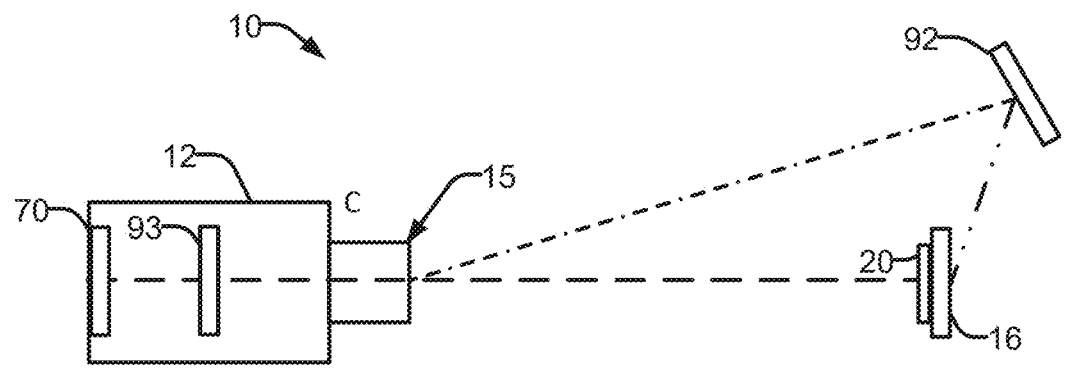
Figure 7E:
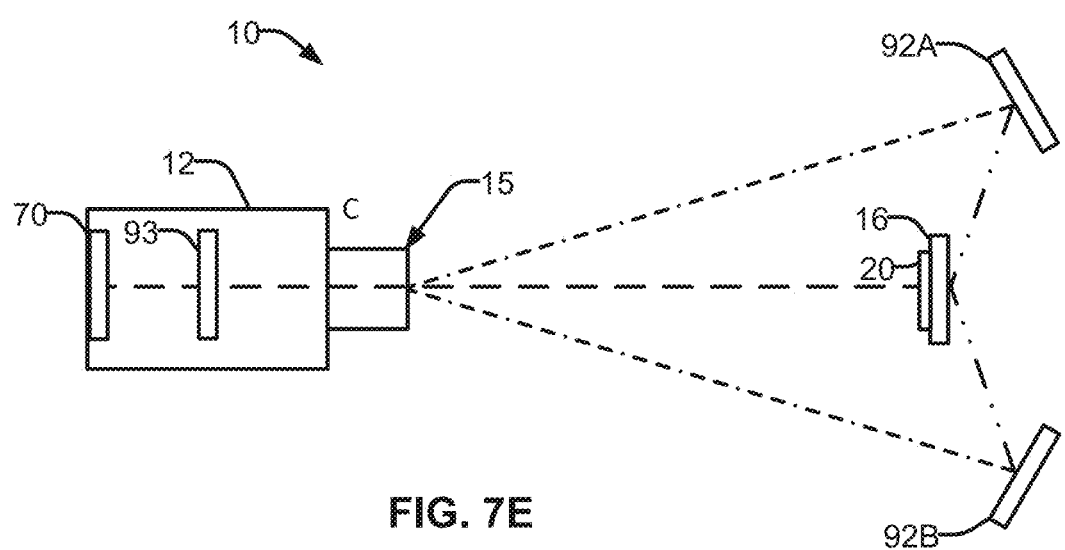
Figure 7G:
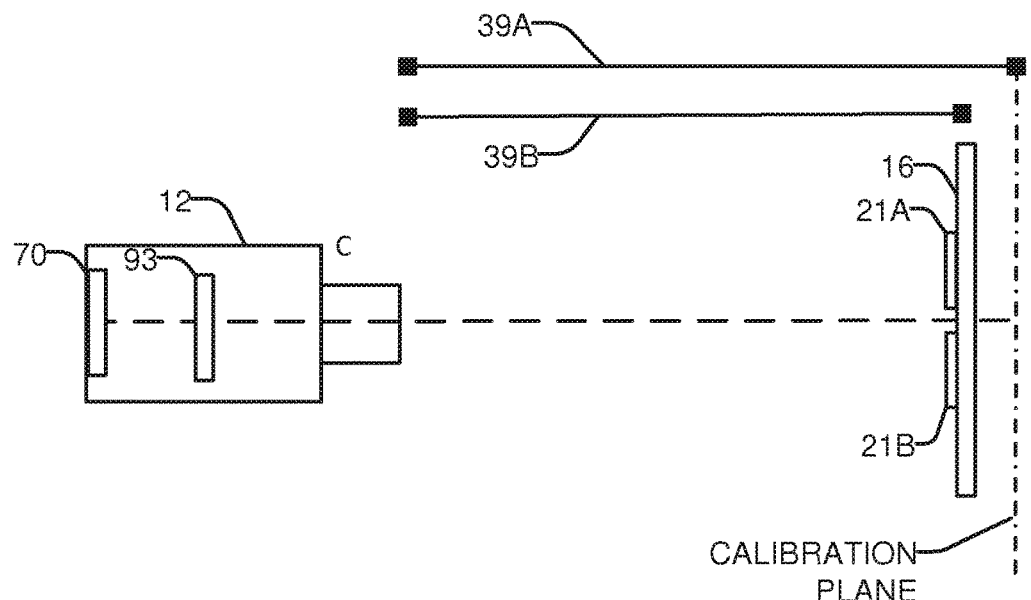
Figure 7H:
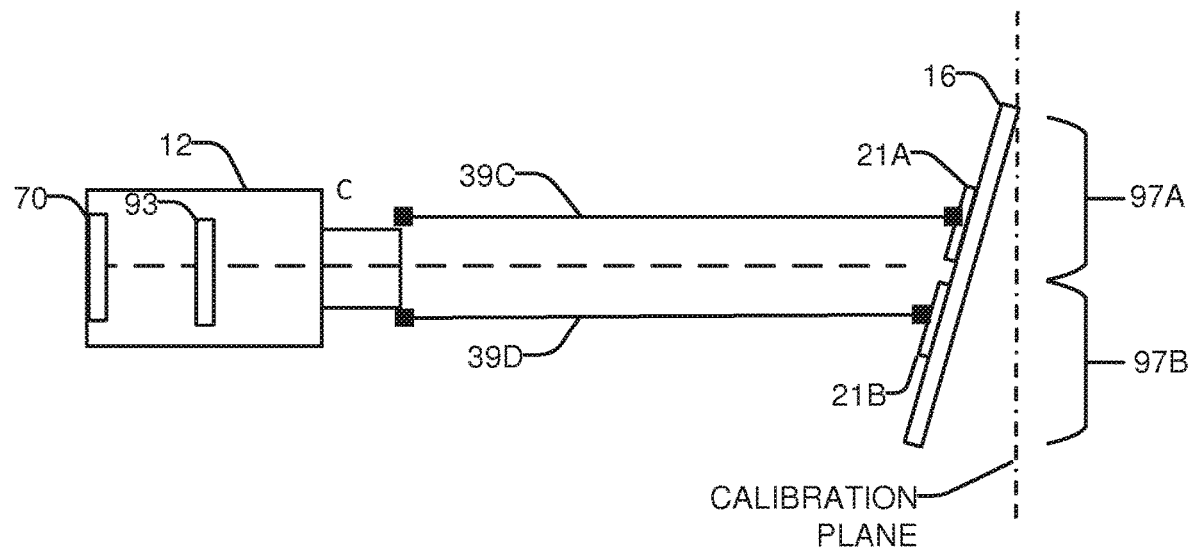

For example, as shown in FIG. 7G, when the test specimen 16 is installed before the start of the test, it might be located at a different Z distance 39B from the camera 12 than the Z distance 39A for which the camera 12 was last calibrated. When the test specimen is installed before the start of the test, it might be installed such that it is not perfectly vertical, such that the upper portion 97A of the test specimen and its lower portion 97B are at different Z distances 39C, 39D, respectively, from the camera, as shown in FIG. 7H. At the start of the test, the test specimen itself might not have a consistent Z distance/shape across the face of the test specimen. For instance, the middle could be bowed out because of how the specimen was created or because of physical stress induced while setting up the test. Perspective errors (e.g., phantom strain) may result, when the reference features being tracked move in the Z axis relative to a calibration plane. Such perspective errors can dominate true data, particularly in regions of small strain (e.g., elastic region of relatively stiff materials), leading to inaccurate measurements.

During the test, one or more factors, such as physical conditions, a response of the specimen to the testing conditions, and the action of testing components (e.g., interaction with the grips holding the specimen), can lead to portions or all of the test specimen changing in the Z-axis.

In some examples, there is a balance between accuracy and field of view in video extensometry systems. Cameras used for video extensometry have a certain fixed underlying image resolution. This resolution will, in turn, impact the accuracy of the two-dimensional measurements calculated from the images. Lenses used in the system can map this underlying fixed image resolution onto the field of view of the test space. Using a magnification that increases the size of the field of view is then a trade-off for a decrease in accuracy.

As a test proceeds, some specimens can change significantly enough during the test (e.g., increase in one or more dimensions) that the field of view needed to cover the entire specimen at the end of the test is much larger than the field of view at the start of the test. This is often the case for so-called "high-elongation" materials, but can apply to a range of materials.

Some materials tests have a higher need for accuracy at the start of the test than at the end of the test. However, the need for a video extensometry system to cover the larger field of view of the entire test limits the available measurement accuracy compared to what it could have when focused on the smaller field of view at the start of the test.

To address these and other sources of error, different system configurations, such as employing multiple-cameras, are disclosed for measuring strain.

In some examples, a multi-camera video extensometry system 10 employs one or more front-facing cameras and one or more side-facing camera. In the example of FIG. 7A, a front-facing camera 12 is used to measure changes in the reference features 20, as disclosed herein. A side-facing camera 12A is added to track changes in the Z-axis 39 between the camera 12 and the test specimen 16.

In this manner, the side-facing camera 12A can track shifting of the test specimen 16 closer to or further away from the front-facing camera 12. The test specimen 16 might slant during the test operation, such that a first or top portion and a second or bottom portion of the test specimen have different Z distances from the front-facing camera 12 (e.g., a constant or a changing angle during the test), but maintain a linear relationship between the first and second portions.

In some examples, the test specimen 16 shape may change in the Z-axis 39 during the test, such that the specimen shape may bow in or out during the test, and/or may have started with a bow, but the shape straightens during the test.

In some examples, the side-facing measurements are used, as a list of non-limiting examples, to validate and/or invalidate the accuracy of the operation prior to and/or after a test; provide interactive information to an operator whilst loading the specimen to guide installation; correct (or compensate) position data generated by the front-facing camera, after the test has completed; correct (or compensate), the position data generated by the front-facing camera in real-time during the test operation; and/or could be configured with front or rear lighting scheme for direct or silhouette image capture. For example, the measurements from both the front- and rear-facing cameras 12, 12A can be provided to the processing circuitry 32 to measure strain of the test specimen 16.

In some examples, as shown in the example FIG. 7B, the video extensometry system 10 employs two or more front-facing cameras 12, 12B, with similar imaging and/or sensing capabilities, each mounted at an angle slightly offset from each other but with the same field of view (e.g., of the test specimen 16). Although FIG. 7B illustrates employing two cameras, additional cameras (e.g., 3, 4 or more) can be included. For example, each camera may be arranged at varying distances, varying angles relative to another camera and/or the test specimen, and/or have varying optical properties (e.g., focus, magnification, optical power, etc.).

In this example, the multiple cameras are able to collect stereo images for offline three-dimensional (3D) Digital Image Correlation (DIC) image analysis, for example. For instance, a first camera can be used to image the reference feature positions in the X-Y plane, while images from the second camera (and/or more than two cameras) can be used to establish the Z-axis movement as a cross-check. The cross-check may provide feedback to the processing circuitry (e.g., processing system 32) and/or an operator, such as to correct and/or compensate for changes in reference feature positions in the X-Y plane.

In some examples, two or more cameras are employed simultaneously to collect 3D stereo images for real-time 3D reference feature tracking. For instance, views from each camera can be used to cross-check camera calibration and provide a notification to confirm calibration and/or inform of needed recalibration. As shown in the example FIG. 7C, overlap between fields of view 95A and 95B (corresponding to upper portion 97A and lower portion 97B, respectively) can additionally provide data for algorithmically filtering of noise and thereby improve imaging accuracy.

In some examples, as shown in FIG. 7F, two front-facing cameras 12, 12B are employed, the first camera 12 having a wide field of view 95C, and the second camera 12B with a narrower field of view 95D contained within the first camera's field of view.

The first, wide field of view camera is configured to encompass the complete range of specimen motion during a test operation, but at a lower resolution relative to the second camera. Thus, the second, narrow field of view camera provides a relatively high-resolution view of the gauge-length portion of the specimen at the start of test, a portion of which might move out of view of this camera during the test.

Combining image data from the first and second cameras optimizes image capture as the test specimen changes, and allows for the measurements to maintain image resolution and displacement accuracy during a test, particularly for high-elongation specimens.

Furthermore, comparing overlapping portions of each field of view provides for Z-axis correction. For instance, the overlapping portion and associated Z-axis correction provides high-resolution imaging of portions of the Z-axis motion during initial specimen loading and testing.

In some examples, as generally shown in the example FIG. 7C, the two or more front-facing cameras 12, 12B are employed, with the first camera 12 with a first field of view 95A covering slightly greater than 50% of a first or upper portion 97A of the test space (or test specimen), and a second camera 12B with a second field of view 95B covering slightly greater than 50% of a second or lower portion 97B of the test space (or test specimen), with a degree of overlap between the first and second fields of view.

In this example, the use of first and second fields of view nearly doubles the amount of distance that high-elongation specimens can be measured.

Moreover, the overlapping portion of the two fields of view between the two cameras provides an amount of stereo vision, facilitating Z-axis measurement and, therefore, correction, as disclosed herein. The portion of overlap provides information on Z-axis motion, which allows for measurement and/or correction during loading and/or testing of a test specimen.

In some examples, a greater elongation displacement specimen can be covered by extending the system to a greater number of cameras (e.g., 3, 4 or more cameras), with a degree of overlap between each adjacent field of view.

In some disclosed examples, as shown in the example FIG. 7B, the multiple (e.g., two or more) front-facing cameras are employed, with one or more cameras configured to adjusting its field of view. The adjustment can be automatic and/or commanded by an operator (e.g., in response to a sensor measurement), and can be incorporated in a calibration step and/or in real-time during a test process.

The adjustment to the field of view can include one or more of a change to the camera magnification, position, and/or orientation of the camera or lens (e.g., vertical and/or horizontal positioning), as a list of non-limiting examples.

In some examples, each camera could be focused to track a single reference feature (e.g., marking, dot, etc.). Each reference feature would be imaged at a high resolution (e.g., the maximum offered by the camera or associated optics) to track position of the reference feature as it moves and/or changes with a high degree of accuracy during the test.

Depending on specimen type and/or materials testing needs, the system may employ a single camera configured for adjustment (e.g., optically and/or physically), whilst the other camera is fixed (e.g., a fixed magnification, position, and/or orientation). In some examples, each camera is configured for adjustment, as disclosed herein. Some example systems may employ a single camera configured for adjustment (e.g., magnification, position, and/or orientation), without employing a second camera.

In some examples where two or more front-facing cameras are employed, a first camera with a first field of view covering a first or upper portion of the test space (or test specimen), and a second camera with a second field of view covering a second or lower portion of the test space (or test specimen), without any overlap between the first and second fields of view:

In some examples, each of the first and second cameras would be focused on a unique first or second reference feature 21A, 21B, respectively. For instance, the first reference feature 21A is located at a top portion 97A, and the second feature 21B is located at a bottom portion 97B.

Each reference feature could have a particular characteristic (e.g., size, shape, location, position, etc.) at the calibration stage and/or initiation of the test process (within the limits of the test space and the calibration procedure), relative to the other reference feature. This would provide high resolution and accuracy for test specimens with a relatively large initial gauge length. The measurements from each camera can then be provided to a processor (e.g., processing system 32) for analysis in view of a predetermined relationship (e.g., arrangement in the test environment) between the cameras.

In some examples, multiple fields of view can be captured by a single camera to provide similar and/or different advantages associated with systems employing multiple cameras without the need and/or expense of employing multiple sets of lenses, cameras, and/or image sensors.

In examples, one or more external mirrors 92 are arranged about the test specimen 16 and/or the camera 12, as shown in FIG. 7D. The one or more mirrors 92 are arranged such that the single camera 12 can view the test specimen 12 and the mirror 92 without movement and/or adjustment of the focus or position of the camera 12. The test specimen 12 and/or the mirror 92 may thus be viewed simultaneously (and/or periodically, alternately, and/or in response to a command).

In some examples, as shown in FIG. 7E, multiple mirrors 92A and 92B could be used to view the test specimen 12 from different angles (e.g., the sides of the specimen, an opposite face of the specimen, etc.). The mirror(s) 92 may be designed to provide the same level of magnification as the camera's 12 direct view of the specimen 16, or a different magnification level.

In some examples, one or more internal optics 93 (e.g., prisms, mirrors, diffraction gratings, filters, etc.) can be employed (e.g., within the camera 12, the testing system 33, etc.) to manipulate the received light. The light from multiple lenses or other optics (e.g. mirrors) could be directed onto different portions of a single image sensor 70, rather than employing a dedicated image sensor for each lens. In some examples, light received from a single lens 15 could be duplicated (e.g., split, reflected, etc.) onto multiple image sensors to improve noise.

In some examples, the light from a single lens 15 or camera 12 could be split and redirected in view of one or more characteristics of the light (e.g., light phase, frequency, etc.) onto different portions of the same image sensor and/or onto different image sensors to improve noise and/or provide Z-axis information. For instance, by employing multiple lenses, different frequency filters can be used for each lens. The information can then be combined with other light data, such as spatial frequency separation provided by prisms.

In some examples, a color image sensor can be used in addition to or in the alternative to a monochromatic sensor. For example, replacing a monochrome sensor with a color image sensor allows for imaging and processing the test specimen using multiple frequencies of light simultaneously. Advantageously, employing color image sensors instead of monochrome sensors simplifies the calibration process, decreases cost, and the reference feature tracking algorithms. The use of sensors configured to receive multiple frequencies of light may further improve noise mitigation, and/or provide Z-axis information.

In a system employing multiple lenses and/or cameras, pairing different frequency filters to each lens can combine with the color separation provided by the image sensor to further increase image collection and accuracy.

In an example, internal optics include a liquid crystal display (LCD) configured to partially occlude portions of a lens and/or particular frequencies of received light. This technique enables 3D image processing using a single lens and/or image sensor.

Noise Reduction

In some disclosed example systems, system operation can generate significant heat, which may degrade performance of one or more components and/or image quality. For example, some system components, such as circuitry, image sensors, etc., may experience negative impacts when exposed to heat.

Figure 8A:
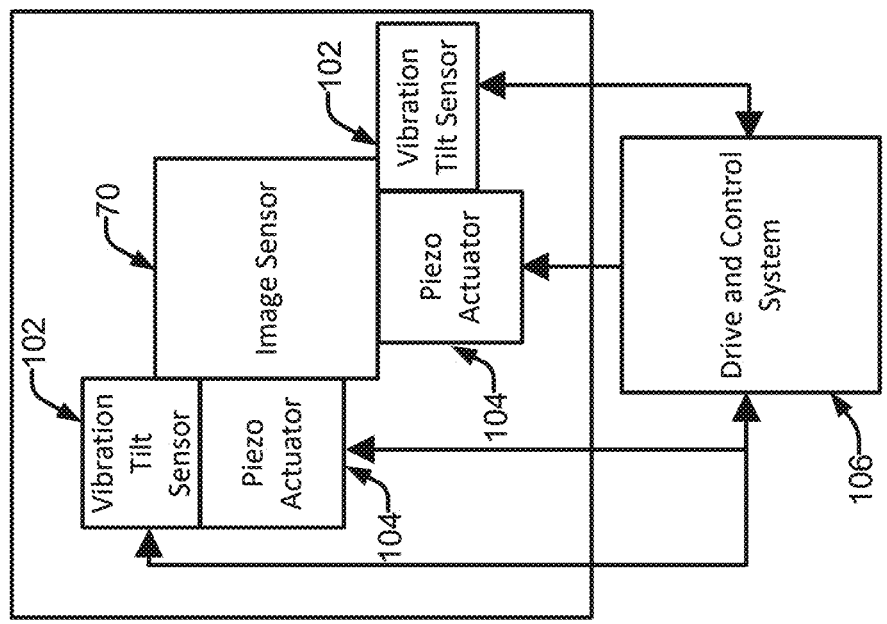
FIGS. 8A and 8B are block diagrams of example extensometer systems, in accordance with aspects of this disclosure.

In disclosed examples, as shown in FIG. 8A, a cooling element 96 may be arranged to cool one or more of a printed circuit board (PCB) 94 and/or the image sensor 70. For example, the cooling element 96 may be an active cooler, such as a thermoelectric electric (e.g., Peltier) cooler attached to the PCB 94 upon which the image sensor 70 (and/or control circuitry) is mounted, and/or in conductive communication with a circuit associated with the image sensor 70. In some examples, the cooling element 96 is connected to an additional or alternative heat sink.

A temperature sensor 98 can be configured to measure the temperature at the image sensor 70 and/or circuitry. The measurements can be used by a temperature controller circuit 100 and/or the processing system 32 to control one or more systems (e.g., the cooling element 96) to regulate component cooling.

Advantageously, use of the cooling element 96 serves to reduce system vibration, as opposed to cooling systems employing mechanical blowers. Further, the cooling effects on the image sensor 70 serve to lower the lens temperature to or near ambient temperature, thereby reducing possible miraging effects in front of the lens. Moreover, cooling of the image sensor 70 causes a reduction in dark current and/or associated background noise, such as when not in use.

Figure 8B:
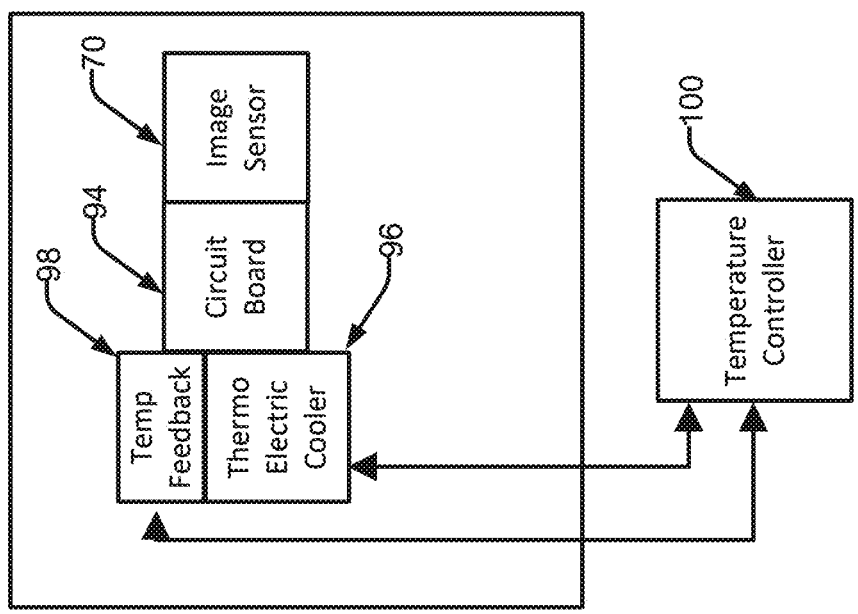

In some disclosed examples, system operation can generate significant vibration, which may degrade performance of one or more components and/or image quality. To mitigate vibration at the image sensor 70, as shown in FIG. 8B, one or more motion sensors 102 (e.g., one or more of an accelerometer, an inertial measurement unit, a vibration sensor, a tilt sensor, etc.) may be arranged to monitor and measure vibrations at and/or near the image sensor 70.

In some examples, the measured data can be provided to a drive and control system 106 and/or the processing system 32 to calculate a compensation factor. For example, image data can be correlated with vibration measurements that violate one or more threshold values. At the correlated data points, the compensation factor can be applied to image data to correct for excess vibration (e.g., exceeding a threshold vibration value).

In additional or alternative examples, measurements from the one or more motion sensors 102 can be analyzed by the drive and control system 106 and/or the processing system 32. Based on the analysis, the drive and control system 106 and/or the processing system 32 can generate one or more control signals to command adjustments to the position or orientation of the image sensor 70 via one or more actuators 104. For instance, the actuators 104 can include a piezo actuator with a mechanical amplifier. In some examples, the measurements and compensation calculations can be performed in real-time during an imaging operation. In some examples, active vibration control can be implemented in concert with image data compensation.

Advantageously, use of the described actuators 104 to actively mitigate effects of vibrations on the system serves to mitigate external oscillations on the imaging sensor 70, as oscillations of the image sensor 70 can introduce noise.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer-readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine-readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A system for correcting for errors during a test process in a video extensometry system, the system comprising:
   a testing system to secure a test specimen;
   an imaging device arranged to capture images of a surface of the test specimen;
   one or more sensors configured to measure one or more parameters associated with the test specimen; and
   a processing system to:
   receive image data from the imaging device;
   receive sensor data from the one or more sensors;
   compare the image data or the sensor data to one or more data threshold values;
   calculate a correction factor based in part on the image data and the sensor data in response to the image data or the sensor data violating the one or more data threshold values; and
   command an adjustment of a position or orientation of the imaging device and an adjustment of a system component based at least in part on the correction factor.

2. The system of claim 1, wherein the system component is an active cooler, an actuator, or an imaging device position system.

3. The system of claim 1, wherein the imaging device is a single view camera.

4. The system of claim 1, wherein the imaging device is two or more cameras.

5. The system of claim 1, wherein the sensor is an accelerometer, an inertial measurement unit, a temperature sensor, an infrared sensor, a light emitting diode sensor, an ultrasonic sensor, or a laser enabled sensor.

6. The system of claim 1, wherein the one or more parameters comprises one or more of a shape or position of the markings, an edge position of the test specimen, or a width of the test specimen.

7. The system of claim 1, wherein the correction factor is in one of millimeters, inches, or pixel units.

8. The system of claim 1, wherein the processing system is located with a remote computing platform in communication with one or more of the testing system or the imaging device.

9. The system of claim 1, wherein the processing system is integrated with one of the imaging device or the testing system.

10. A system for correcting for errors during a test process in a video extensometry system, the system comprising:
    a testing system to secure a test specimen;
    an imaging device arranged to capture images of a surface of the test specimen;
    one or more motion sensors configured to measure one or more movement parameters associated with the video extensometry system;
    one or more actuators to adjust a position or orientation of the imaging device; and
    a processing system to:
    receive image data from the imaging device;
    receive sensor data corresponding to vibration measurements from the one or more motion sensors;
    compare the image data or the sensor data to one or more data threshold values;
    calculate a correction factor based in part on the image data and the sensor data in response to the sensor data violating the one or more data threshold values; and
    command the one or more actuators to adjust the position or the orientation of the imaging device based at least in part on the correction factor.

11. The system of claim 10, wherein the one or more motion sensors includes an accelerometer, an inertial measurement unit, a vibration sensor, or a tilt sensor.

12. The system of claim 10, wherein the one or more motion sensors are arranged near the one or more image sensors to monitor and measure vibrations at the one or more image sensors.

13. The system of claim 10, wherein the one or more data threshold values correspond to one or more data threshold vibration values, the processing system is further operable to correlate image data with vibration measurements that violate the one or more threshold vibration values.

14. The system of claim 13, wherein the processing system is further operable to apply a compensation factor to the image data at correlated data points that exceed the one or more threshold vibration values to correct for excess vibration.

15. The system of claim 10, further comprising a drive and control system to receive instructions from the processing system to control the one or more actuators.

16. The system of claim 10, wherein the one or more actuators can include a piezo actuator with a mechanical amplifier.

17. The system of claim 10, wherein the processing system is further configured to perform measurements and compensation calculations in real-time during an imaging operation.

18. The system of claim 10, wherein active vibration control can be implemented in concert with image data compensation.

19. The system of claim 10, wherein the processing system is located with a remote computing platform in communication with one or more of the testing system or the imaging device.

20. The system of claim 10, wherein the imaging device comprises two or more imaging devices, each imaging device operable to capture images of the surface of the test specimen.

* * * * *